April 26, 1927.

P. A. QUINN 1,626,151

AUTOMOBILE BRAKE

Filed Dec. 10, 1924

Inventor

Patrick A Quinn

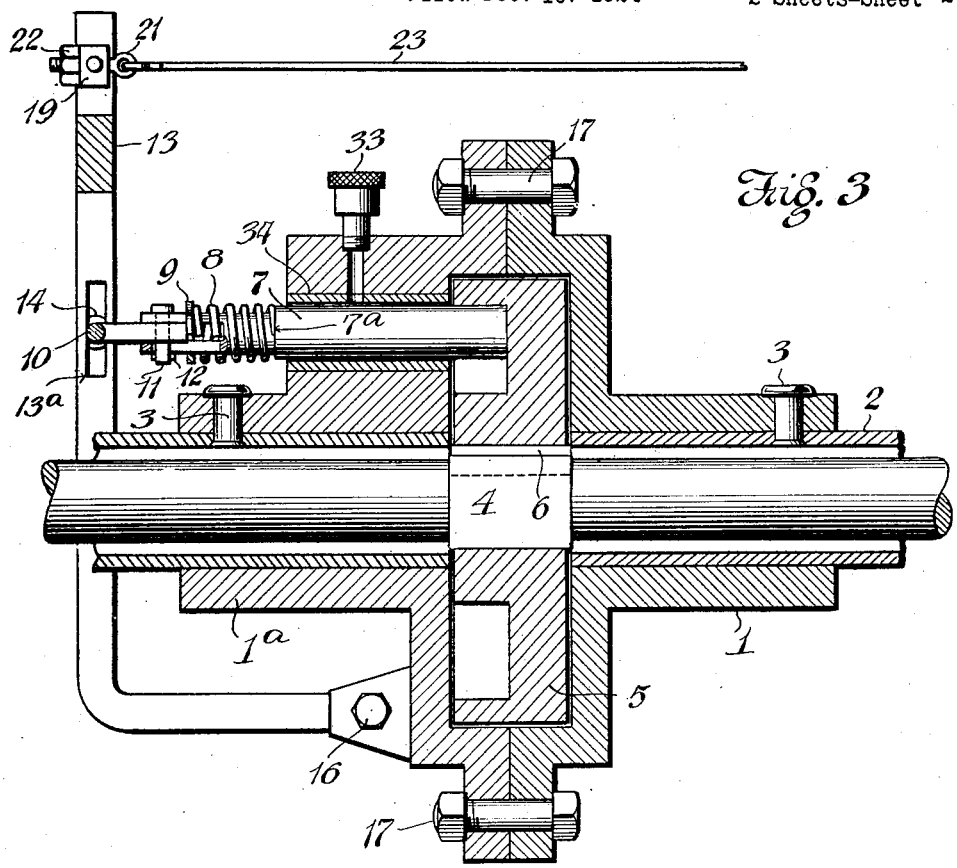
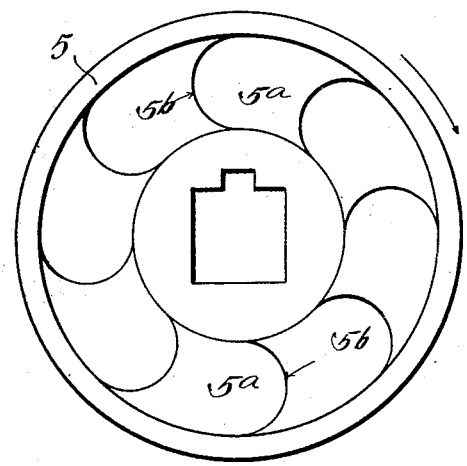
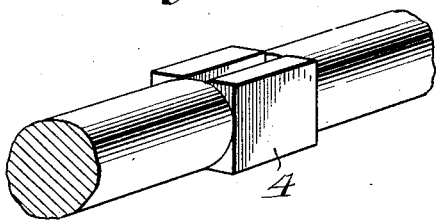

Patented Apr. 26, 1927.

1,626,151

UNITED STATES PATENT OFFICE.

PATRICK A. QUINN, OF CLIFTON, NEW JERSEY.

AUTOMOBILE BRAKE.

Application filed December 10, 1924. Serial No. 755,022.

The object of the invention is, primarily, to afford auxiliary means, independent of the usual brake mechanism, whereby retrogressive movement of the automobile may be positively prevented upon occasion without interference with the forward propulsion of the car, substantially as and for the reasons hereinafter fully set forth,—the invention consisting essentially in the combination, with the motor drive shaft, of brake mechanism operative in reversal of shaft motion only, when set, in conjunction with control means accessibly positioned as related to the driver of the car.

In the accompanying drawings I illustrate a practical embodiment of the essential features of my invention, although I do not limit myself to the identical form, construction and arrangement of component parts and appurtenances shown herein by way of exemplification, since changes may be made in minor details, and equivalent mechanical expedients resorted to, with like results, and without departing from the spirit and intent of my invention in this respect.

With this understanding:—

Fig. 3 is a central vertical longitudinal sectional elevation of the brake mechanism, on a slightly reduced scale, as compared with Fig. 2;

Fig. 4 is a face view of the clutch cam disc;

Fig. 5 is a perspective detail of the portion of the drive shaft on which the brake disc is mounted.

Figure 1:
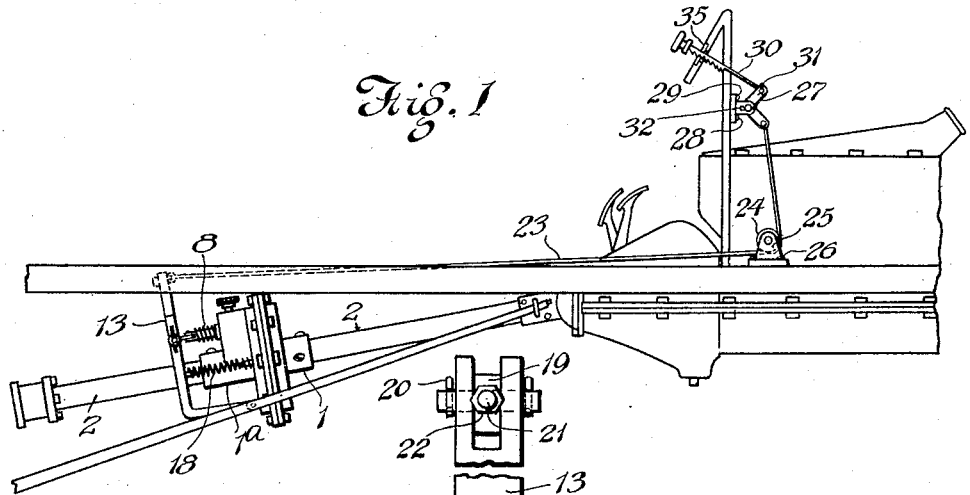
Fig. 1 is a side elevation of my auxiliary brake mechanism and adjacent parts of an automobile on which it is installed.

The casing 1, is rigidly secured by rivets 3, 3, to a housing 2, rigidly affixed to the chassis or other permanent structure of the car, so as to be non-rotatable thereon. The front 1, and rear section 1ª, of the casing are secured together by suitable means, as by bolts 17, 17, as indicated more particularly in Figs. 2 and 3, of the drawings.

Mounted within the casing 1, 1ª, and upon the motor drive shaft 4, of the machine is the brake disc 5, affixed to said shaft 4, by a key 6, or equivalent means so as to be rotatable therewith. This brake disc 5, is formed on its rear face with a series of inclined cam surfaces 5ª, with intermediate shoulders 5ᵇ, as will be understood by reference more particularly to Figs. 3 and 4, of the drawings, the arrow in Fig. 4, indicating the direction of reverse motion of the said drive shaft 4.

Figure 2:
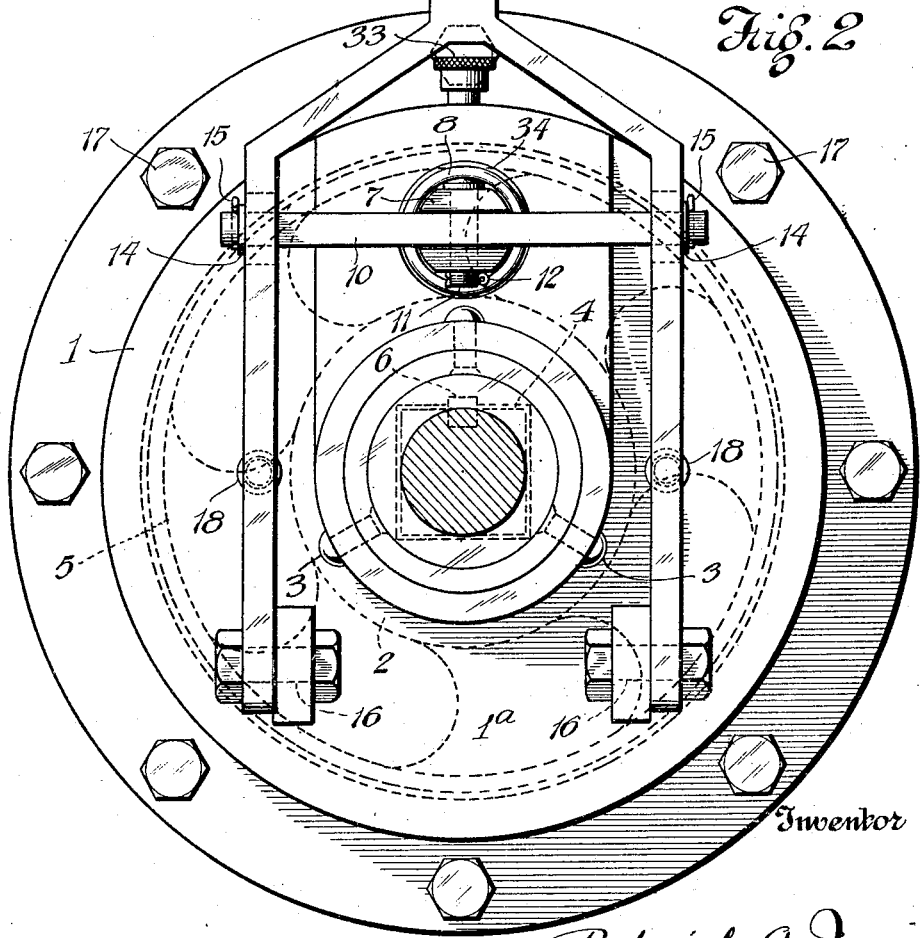
Fig. 2 is a rear end elevation, upon a larger scale, of the main portion of my auxiliary brake device, the drive shaft being shown in section.

Slidably mounted in a bushing 34, in the rear member 1ª, of the casing 1, 1ª, is a spring bolt or latch pin 7, lubricated by means of an oil cup 33, the shank or rear extension of said spring bolt 7, being longitudinally slotted and coupled by means of a pin 11, and cotter key 12, to a tongue 10ˣ, on the cross bar 10, which is connected with the bifurcated lever 13, as illustrated more particularly in Figs. 2 and 3, of the drawings.

Interposed between a shoulder 7ª, on the spring bolt 7, and a washer 9, positioned on the slotted shank thereof, is a compression spring 8, which tends constantly to thrust the said bolt 7, forward for contact with the cam surfaces 5ª, of the clutch cam disc 5.

The ends of the cross bar 10, extend through slots 13ª, in the bifurcated arms of the rock lever 13, being connected with the latter by means of washers 14, and cotter keys 15, as shown more particularly in Fig. 2, of the drawings, said rock lever 13, being fulcrumed on bolts 16, 16, integral with the rear section 1ª, of the casing.

A swivel block 19, is secured by a cotter pin 20, between the bifurcated upper extremity of the rock lever 13, an eye bolt 21, and nut 22 being connected with said swivel block as indicated more particularly in Figs. 2 and 3, of the drawings and this eye bolt 21, being connected with a flexible cable 23, which extends to and around a pulley 24, mounted on a stand 25, on the frame of the machine, and thence to one arm of a bell crank lever 27, fulcrumed on a fixed bracket 28, the other arm of said bell crank lever 27, having pivotally attached to it a rack tooth rod 30, the teeth of which are engageable with a notch plate 35, affixed to the dash board or other fixed part of the machine.

Push springs 18, 18, are interposed between the arms of the rock lever 13, and the rear section 1ª, of the casing as indicated in Figs. 1 and 2, of the drawings, and tend constantly to thrust said rock lever 13, rearward, thereby retracting the spring bolt 7, from contactual engagement with the brake cam disc 5, this being the normal inactive condition of the parts. When it is desired to bring the spring bolt 7, into operative relation to the brake cam disc 5, this is accomplished by rocking the lever 13, forward through the medium of the cable 23, and bell crank lever 27 and rack tooth rod 30, the latter being utilized in conjunction with the notch plate 35, to maintain the engagement between spring bolt 7, and disc 5, as long as desired.

When operative engagement is thus established between the spring bolt 7, and the brake cam disc 5, it is obvious that the said bolt 7, will duly prevent reverse rotation of the motor shaft 4, by engagement with any one of the several shoulders $5^b$, on said disc, and this without interference with the forward drive of the said motor shaft 4, since in that event the inclined cam surfaces $5^a$, on said disc 5, will successively force the bolt 7, back to clear said shoulders $5^b$, without engagement therewith.

Hence my auxiliary brake device is obviously adapted, when set, to automatically prevent all involuntary backward movement of an automobile equipped therewith, as in cases where a motor stalls or stops on a hill or incline, or when the ordinary brakes of the car fail to function properly. For this reason the use of the ordinary brakes are unnecessary in ascending a hill when my auxiliary safety brake is set, thus eliminating the difficulty of starting up an incline while operating the ordinary brakes at the same time, always heretofore a source of trouble to motorists. Thus, my brake, a safety hill brake so called, may be set before ascending an incline so that in case of emergency it will apply itself automatically; or it can be applied or released at the convenience of the operator.

What I claim as my invention and desire to secure by Letters Patent, is:—

In a device of the character designated, a casing, a motor drive shaft, a brake cam disc rotatable with said shaft and having shouldered cam surfaces in its face, a bell-crank lever pivotally mounted at one end on said casing and having a slot, a cross bar carried by said lever, a spring-actuated bolt having sliding connection with said cross bar and the latter working in said slot, said bolt being disposed parallel with said shaft, and a swiveled block connected with the free end of said lever for moving the latter to actuate said bolt to move the bolt out of register with the cams of the disc.

PATRICK A. QUINN.